United States Patent [19]
Demurjian

[11] Patent Number: 5,522,344
[45] Date of Patent: Jun. 4, 1996

[54] COLLAPSIBLE, WINDOW-MOUNTED PET CAGE

[76] Inventor: Michael Demurjian, 284 Wadsworth Ave., New York, N.Y. 10040

[21] Appl. No.: 288,575

[22] Filed: Aug. 10, 1994

[51] Int. Cl.$^6$ .................................................. A01K 31/00
[52] U.S. Cl. .......................................... 119/474; 119/484
[58] Field of Search ........................... 119/15, 17, 19, 119/161, 165, 168

[56] References Cited

U.S. PATENT DOCUMENTS

| | | | |
|---|---|---|---|
| 3,195,506 | 7/1965 | Beard | 119/19 |
| 4,029,048 | 6/1977 | Fershbein | 119/19 |
| 4,291,645 | 9/1981 | Cruchelow et al. | 119/19 |
| 4,484,540 | 11/1984 | Yamamoto | 119/19 |
| 4,788,934 | 12/1988 | Petter | 119/19 |
| 4,989,546 | 2/1991 | Cannaday | 119/19 |
| 5,165,366 | 11/1992 | Harvey | 119/165 |

*Primary Examiner*—Gene Mancene
*Assistant Examiner*—Thomas Price
*Attorney, Agent, or Firm*—Collard & Roe

[57] ABSTRACT

A pet cage capable of ready disassembly and erection for mounting within a window having a bottom rail and a stop, and projecting beyond the window opening. The pet cage consists of a 5-sided enclosure, including a hollow panel. An accordion-pleated panel assembly is removably connected to the enclosure for adjustably extending between the enclosure and the window stop. Upon disassembly, the panel assembly is removed from the enclosure and stored within the hollow panel so that the disassembled pet cage forms a single, compact, portable structure.

15 Claims, 2 Drawing Sheets

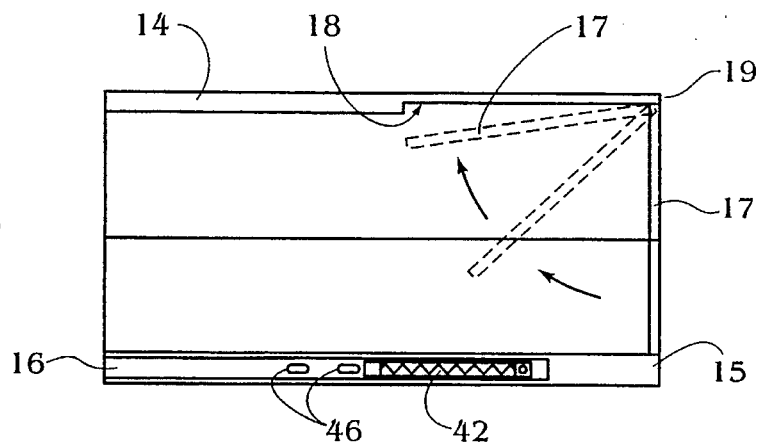
Fig.2
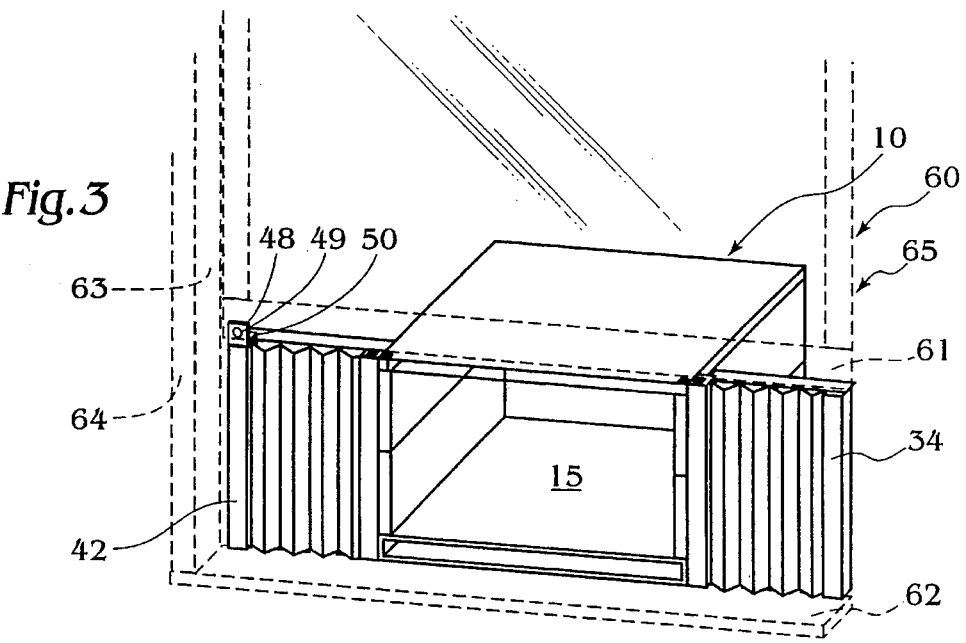
Fig.3
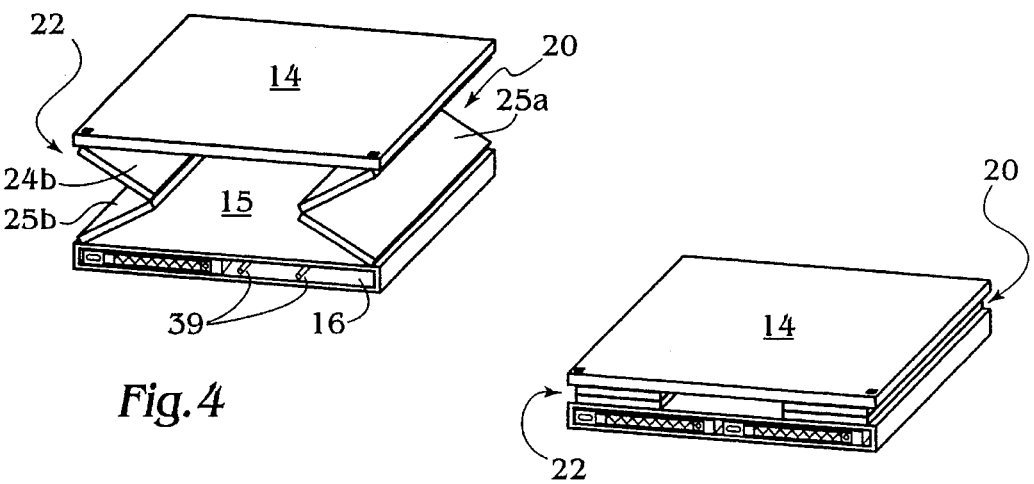
Fig.4
Fig.5

COLLAPSIBLE, WINDOW-MOUNTED PET CAGE

BACKGROUND OF THE INVENTION

1. Field of the Invention

The present invention relates to a collapsible, window-mounted pet cage.

2. The Prior Art

Foldable houses for pets have been previously proposed but are subject to numerous disadvantages. Pet cages are disclosed in U.S. Pat. Nos. 3,738,322 to Smith, 5,165,366 to Harvey, and 5,167,202 to Bradford et al. The prior art construction generally includes a large number of separate components which are bulky and require fasteners for holding them in the assembled position.

Other portable or foldable pet cages are disclosed in U.S. Pat. Nos. 3,144,852 to Messeas, 3,324,831 to St. Onge, and 4,445,459 to Julie. Of these patents, only the '459 reference discloses a window-mounted pet cage. The '459 patent has numerous disadvantages in its construction and assembly. The side, rear and top walls include frame pieces adapted for selective panel mounting and substitution. This means that there is at least one extra set of panels which can easily be lost. In addition, the pet porch is secured to the window by clamps and does not have adjustable side panels to occupy the space between either side of the pet porch and the window frame.

SUMMARY OF THE INVENTION

It is, therefore, an object of the present invention to overcome the drawbacks of the prior art and to provide a collapsible window-mounted pet cage that is easily mounted in any size window.

It is a further object of the present invention to provide a pet cage that can be easily erected and collapsed.

It is yet another object of the present invention to provide a pet cage where all of the parts are stored within a single, compact unit.

These and other related objects are achieved according to the invention by a pet cage capable of ready disassembly and erection for mounting to a window frame for projecting beyond the window opening. The pet cage consists of a partially screened-in five-sided enclosure having a top panel, a hollow bottom panel and a back panel pivotally mounted to the top panel and pivotal between a folded position against the top panel and an erected position transverse to the top panel. Two split-hinged side walls extend between the top and bottom panels and are movable between a folded position, sandwiched between the top and back panels and the bottom panel, and an erected position. Each side walls includes an upper part with a first bore and a lower part with a second bore. The bores are aligned with each other when the side walls are in the erected position. Two expanding accordion-pleated panels, each having a vertically extending aperture, extend between and releasably form a seal between the enclosure and the window frame. The cage further includes an elongated U-bolt having two substantially parallel legs, with one leg being disposed within the aligned bores and the other leg being disposed in the vertically extending aperture. One elongated U-bolt connects each of the accordion-pleated panels to one of the erected side walls and maintains the side walls in a vertical and operable condition. The accordion-pleated panels and the U-bolts are stored within the hollow bottom panel upon disassembly of the pet cage, so that the disassembled pet cage forms a single, compact, portable structure.

Alternatively, the invention relates to a pet cage capable of ready disassembly and erection for mounting within a window, having a bottom rail and a stop, for projecting beyond the window opening. The pet cage includes a five-sided enclosure having a hollow panel. An accordion-pleated panel assembly is removably connected to the enclosure for adjustably extending between the enclosure and the window stop. Upon disassembly, the panel assembly is removed from the enclosure and stored within the hollow panel so that the disassembled pet cage forms a single, compact, portable structure. The enclosure includes a top panel, a bottom panel, a back panel extending between the top and the bottom panels, and two side panels extending between the top and bottom panels. The top panel has a back edge and a recessed surface adjacent the back edge. The pack panel is pivotally mounted to the back edge and foldable adjacent and against the recessed surface.

Each side panel includes an upper member pivotally connected to the top panel, a lower member pivotally connected to the bottom panel and hinge means pivotally connecting the upper panel to the lower panel. Each member includes a rigid rectangular frame and screening extending across and secured to the rigid frame. Each of the top and back panels include a rigid rectangular frame and screening extending and secured to the rigid frame.

The pet cage further includes rod means for removably connecting the panel assembly to the enclosure. The upper and lower members each include a bore through the rigid frame, where pivoting the upper and lower members into the erected position aligns the respective bores to jointly receive the rod means.

The cage includes two panel assemblies removably connected to the two side panels, with each panel assembly including an aperture for aligning with the respective bores to receive the rod means jointly with the bores. The rod means comprises a bolt for inserting into each aperture and the aligned bores.

Alternatively, each panel assembly includes an aperture disposed adjacent and parallel to the aligned bores for receiving the rod means. The rod means comprises a U-bolt with two legs, one of the legs is inserted into the aligned bores and the other leg is inserted into the aperture.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 2 is a cross-sectional view taken along the line 2—2 of FIG. 1;

FIG. 3 is a perspective view of the pet cage mounted in a window;

FIG. 4 is a perspective view of the pet cage partially collapsed; and

FIG. 5 is a perspective view of the pet cage completely collapsed.

DETAILED DESCRIPTION OF PREFERRED EMBODIMENTS

Figure 1:
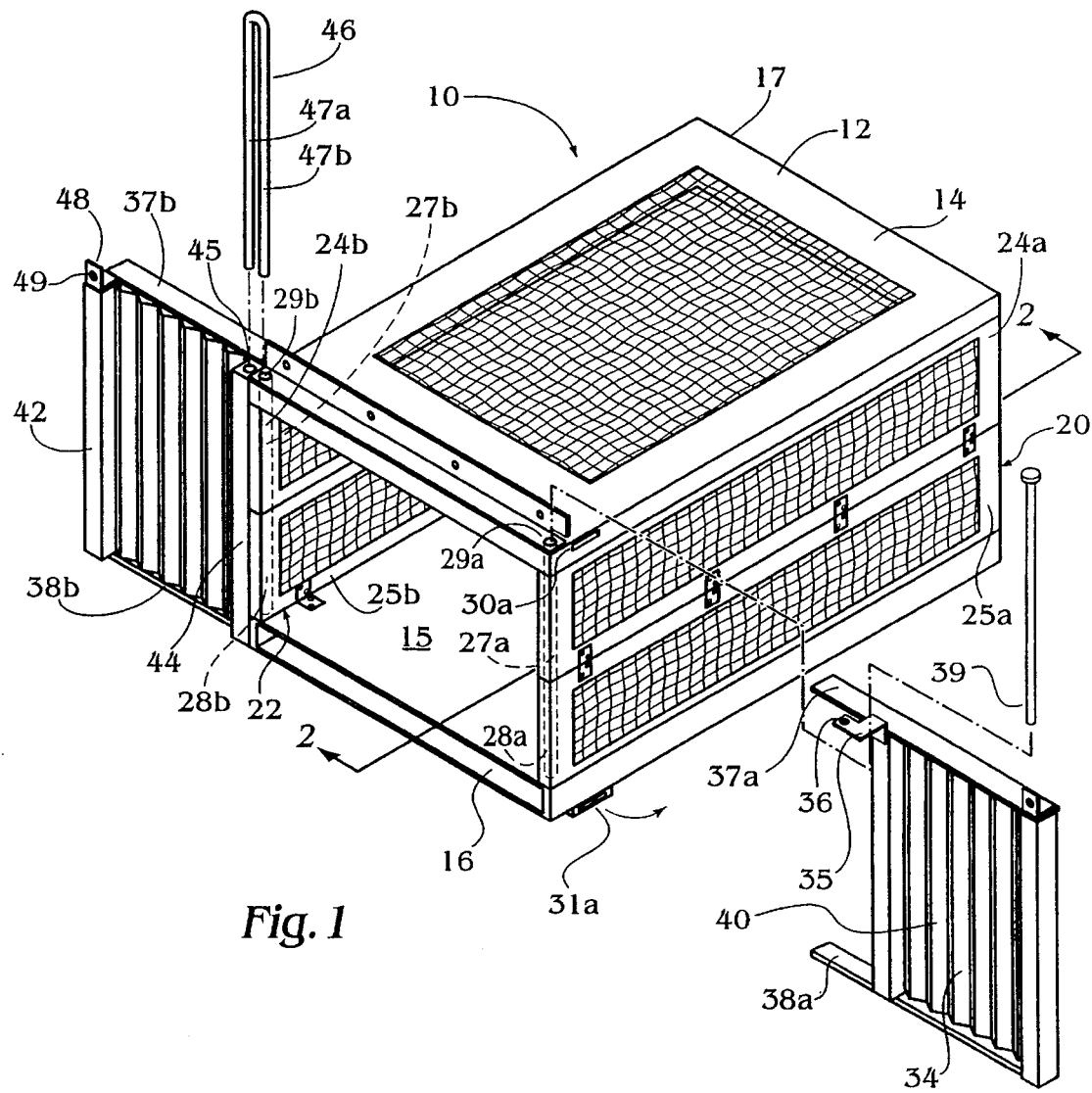
FIG. 1 is a perspective view of an embodiment of the pet cage according to the invention.

Turning now in detail to the drawings, and in particular FIG. 1, there is shown a pet cage 10 in the assembled or erected condition having a partially screened-in 5-sided enclosure 12 for mounting onto a window frame for projecting beyond the window opening. Enclosure 12 consists of a top panel 14, a hollow bottom panel 15 with an opening 16, and a back panel 17 (which can be seen in FIG. 2). Top panel 14 is provided with top bores 29a and 29b. The enclosure also includes a right split-hinged side wall 20 and a left split-hinged side wall 22. The side walls include upper parts 24a and 24b and lower parts 25a and 25b. The upper part 24a and 24b each include an upper bore 27a and 27b while the lower parts 25a and 25b each include a lower bore 28a and 28b. When side walls 20 and 22 are in the erected position, bores 27a and 28a are aligned with each other as well as with top bore 29a. When side wall 22 is in the erected position, upper bore 27b and lower bore 28b are aligned with each other as well as with top bore 29b.

A right expanding panel 34 includes a bracket 35 with a bracket bore 36 that is aligned with top bore 29 upon attachment of expanding panel 34 onto enclosure 12. The central part of expanding panel 34 includes accordion pleats 40. Guide arms 37a and 38a slide within correspondingly shaped slots 30a and 31a located within top panel 14 and bottom panel 15, respectively. Expanding panel 34 is attached to enclosure 12 by sliding guide arms 37a and 38a into slots 30a and 31a until bracket bore 36 is aligned with top bore 29a. A correspondingly sized bolt 39 then is inserted into bracket bore 36, through top bore 29a and upper bore 27a and into lower bore 28a. Bolt 39 also serves to maintain upper part 24a and lower part 25a in an aligned, vertical and erected position.

A left expanding panel 42 has a vertically extending post 44 which includes a vertically-extending aperture or post bore 45. A U-bolt 46 having parallel legs 47a and 47b is used to join left expanding panel 42 to enclosure 12. Leg 47a is inserted into post bore 45 while leg 47b is inserted into top bore 29b through upper bore 27b and into lower bore 28b. A flange 48 is provided with a flange bore 49 for securing expanding panel 42, in the fully expanded position, to the window bottom rail. For example, a wood screw is inserted through flange bore 49 into the wooden bottom rail.

Upper parts 24a and 24b are pivotally connected to top panel 14 and lower parts 25a and 25b. Additionally, lower parts 25a and 25b are pivotally connected to bottom panel 15. Upper parts 24a and 24b, lower parts 25a and 25b, top panel 14 and back panel 17 may each consist of a rigid rectangular frame with screening extending across and secured to the frame.

As can be seen in FIG. 2, top panel 14 includes a recess 18 adjacent a back edge 19 thereof. Recess 18 is configured and dimensioned so that back panel 17, which is pivotally mounted at its top edge to back edge 19, can be folded inwardly adjacent and within the recess. FIG. 2 also shows left expanding panel 42 and U-bolt 46 stored within opening 16 of bottom panel 15. Opening 16 is intended to be configured and dimensioned to accommodate both expanding panels and both bolts.

As can be seen in FIG. 3, pet cage 10 is mounted within a window 60 below the window bottom rail 61 and above the window stool 62. Right expanding panel 34 and left expanding panel 42 extend out to the window stop 63 which is adjacent the window casing 64. A wood screw 50 extends through flange bore 49 within flange 48 into the window bottom rail 61. This serves the dual function of maintaining left expanding panel 42 adjacent window stop 63 and maintaining bottom rail 61 of lower sash 65 locked against the top side of pet cage 10. Although only left expanding panel 42 is shown secured to bottom rail 61, it should be understood that right expanding panel 34 may be similarly secured.

When it is desired to move or store pet cage 10, bolt 50 is removed, lower sash 65 is raised slightly and pet cage 10 is removed from the window. Back panel 17 is then folded up into recess 18, as shown in FIG. 2. Bolt 39 and U-bolt 46, depending on which design is used, are pulled vertically up to release right expanding panel 34 and left expanding panel 42 from enclosure 12. The bolts and expanding panels are slid into opening 16. Side walls 20 and 22 are then collapsed by folding them inwardly toward each other, as shown in FIG. 4. As side walls 20 and 22 are folded, top panel 14 is brought toward bottom panel 15. In the fully collapsed position, as shown in FIG. 5, side walls 20 and 22 are each folded onto themselves and are sandwiched between top panel 14 and bottom panel 15. As can be appreciated, top panel 14 and bottom panel 15 are only separated by a distance equal to the thickness of upper part 24a plus the thickness of lower part 25a. The expanding panels and bolts are stored within opening 16 and do not add additional thickness to the folded pet cage.

While several embodiments of the present invention have been shown and described, it is to be understood that many changes and modifications may be made thereunto without departing from the spirit and scope of the invention as defined in the appended claims.

What is claimed is:

1. A pet cage capable of ready disassembly and erection for mounting onto a window frame for projecting beyond the window opening, the pet cage comprising:

partially screened-in, five-sided enclosure including
  (i) a top panel,
  (ii) a hollow bottom panel,
  (iii) a back panel pivotally mounted to said top panel and pivotal between a folded position against said top panel and an erected position transverse to said top panel,
  (iv) two split-hinged side walls for extending between said top and bottom panels and movable between a folded position sandwiched between said top and back panels and said bottom panel and an erected position, each side wall including an upper part with a first bore and a lower part with a second bore, the bores being aligned with each other when said side wall is in the erected position;

two expanding accordion-pleated panels, each having a vertically-extending aperture, for extending between and releasably forming a seal between said enclosure and the window frame; and two elongated U-bolts, each having two substantially parallel legs, one leg of each U-bolt being disposed within said first and second bores and the other leg being disposed within the vertically-extending aperture, for connecting each of said accordion-pleated panels to one of the erected side walls and maintaining said side wall in a vertical and operative condition;

wherein said accordion-pleated panels and said two elongated U-bolts are stored within said hollow bottom panel upon disassembly of the pet cage so that the disassembled pet cage forms a single, compact, portable structure.

2. A pet cage capable of ready disassembly and erection for mounting within a window, having a bottom rail and a stop and projecting beyond the window opening, the pet cage comprising:

a five-sided enclosure including a hollow bottom panel, a top panel, a back panel extending between said top and bottom panels and two side panels extending between said top and bottom panels, said top panel has a back edge and a recessed surface adjacent said back edge, wherein said back panel is pivotally mounted to said back ed and foldable adjacent the recessed surface; and an accordion-pleated panel assembly removably connected to said enclosure for adjustably extending between said enclosure and the window stop, upon disassembly, said panel assembly being removed from said enclosure and stored within said hollow panel so that the disassembled pet cage forms a single, compact, portable structure.

3. The pet cage of claim 2, wherein each side panel comprises:

an upper member pivotally connected to said top panel;

a lower member pivotally connected to said bottom panel; and hinge means pivotally connecting said upper panel to said lower panel.

4. The pet cage of claim 3, wherein each member comprises:

a rigid rectangular frame; and screening extending across and secured to said rigid frame.

5. The pet cage of claim 4, wherein each of said top and back panels comprise:

a rigid rectangular frame; and screening extending across and secured to said rigid frame.

6. The pet cage of claim 5, comprising rod means for removably connecting said panel assembly to said enclosure.

7. The pet cage of claim 6, said upper and lower members each include a bore through said rigid frame, wherein pivoting said upper and lower members into an erected position aligns the respective bores to jointly receive said rod means.

8. The pet cage of claim 7, including two panel assemblies removably connected to said two side panels wherein each panel assembly includes an aperture for aligning with the respective bores to receive said rod means jointly with the bores.

9. The pet cage of claim 8, wherein said top panel includes two holes for aligning with the respective bores.

10. The pet cage of claim 9, wherein said rod means comprises a bolt for inserting into each bore, the respective aperture, and the respective hole.

11. The pet cage of claim 7, including two panel assemblies removably connected to said two side panels, wherein each panel assembly includes an aperture disposed adjacent and parallel the bores for receiving said rod means jointly with the bores.

12. The pet cage of claim 11, wherein said top panel includes two holes for aligning with the respective bores.

13. The pet cage of claim 12, wherein said rod means comprises a U-bolt with two legs, one of said legs being inserted into the bore and the respective hole and the other of said legs being inserted into the adjacent aperture.

14. A pet cage capable of ready disassembly and erection comprising:

a five sided enclosure including a top panel, a bottom panel, and two split hinged side walls extending between said top panel and said bottom panel and movable between an erected position and a folded position sandwiched between said top panel and said bottom panel;

said top panel including a back edge and a recessed surface adjacent said back edge; and said enclosure further including a back panel extending between said top panel and said bottom panel and pivotally mounted to said back edge and foldable adjacent the recessed surface.

15. The pet cage of claim 14, further comprising panel assembly means removably connected to said enclosure for adjustably extending between said enclosure and a window stop.

* * * * *